US012478544B1

(12) United States Patent
Zhang

(10) Patent No.: US 12,478,544 B1
(45) Date of Patent: Nov. 25, 2025

(54) STIMULATING DEVICE

(71) Applicant: Beston (Shenzhen) Technology Co., Ltd, Guangdong (CN)

(72) Inventor: Zhenbo Zhang, Guangdong (CN)

(73) Assignee: Beston (Shenzhen) Technology Co., Ltd, Guangdong (CN)

( * ) Notice: Subject to any disclaimer, the term of this patent is extended or adjusted under 35 U.S.C. 154(b) by 0 days.

(21) Appl. No.: 18/940,657

(22) Filed: Nov. 7, 2024

(30) Foreign Application Priority Data

Jul. 26, 2024 (CN) ........................ 202421797207.1

(51) Int. Cl.
*A61H 19/00* (2006.01)

(52) U.S. Cl.
CPC ..... *A61H 19/44* (2013.01); *A61H 2201/1215* (2013.01); *A61H 2201/1669* (2013.01)

(58) Field of Classification Search
CPC .......... A61H 2205/087; A61H 2201/12; A61H 2201/1215; A61H 2201/14; A61H 2201/1436; A61H 2201/1481; A61H 2023/0272; A61H 2023/0281; A61H 2023/029; A61H 23/00; A61H 23/02; A61H 23/0254; A61H 23/0263; A61H 21/00; A61H 7/004; A61H 7/005; A61H 19/34; A61H 19/44
See application file for complete search history.

(56) References Cited

U.S. PATENT DOCUMENTS

| | | | | |
|---|---|---|---|---|
| 4,604,993 | A * | 8/1986 | Moriwaki | A61H 23/0263 601/18 |
| 8,721,523 | B2 * | 5/2014 | Lee | A61H 19/44 600/38 |
| 2005/0192519 | A1 * | 9/2005 | Crunick | A61H 23/0263 601/72 |
| 2005/0273024 | A1 * | 12/2005 | Nan | A61H 19/44 600/38 |
| 2008/0119767 | A1 * | 5/2008 | Berry | A61H 21/00 601/46 |
| 2011/0082332 | A1 * | 4/2011 | Lee | A61H 23/00 600/38 |
| 2014/0046127 | A1 * | 2/2014 | Topolovac | A61H 23/04 600/38 |

(Continued)

*Primary Examiner* — Victoria Murphy
*Assistant Examiner* — Savannah L Gabriel
(74) *Attorney, Agent, or Firm* — ScienBiziP, P.C.

(57) ABSTRACT

A stimulating device, wherein the stimulating device comprises: a main body; a stimulating member attached to the main body for stimulating the user; and a driving portion received in the main body; and a first oscillating portion and a second oscillating portion coupled to the driving portion; wherein the first oscillating portion and the second oscillating portion are respectively disposed in the stimulating portion, the stimulating portion is engaged by at least one of the first oscillating portion and the second oscillating portion to oscillate when the first and second oscillating portion are separately driven by the driving portion, wherein the stimulating device includes a first oscillating mode and a second oscillating mode, only one of the first oscillating portion and the second oscillating portion is driven in the first oscillating mode, both of the first oscillating portion and the second oscillating portion are driven in the second oscillating mode.

7 Claims, 6 Drawing Sheets

(56) References Cited

U.S. PATENT DOCUMENTS

| | | | | |
|---|---|---|---|---|
| 2015/0359703 | A1* | 12/2015 | Richardson, II ....... | A61H 19/44 600/38 |
| 2018/0078449 | A1* | 3/2018 | Callow .................. | A61H 19/00 |
| 2018/0168913 | A1* | 6/2018 | Sedic ................. | A61H 23/0254 |
| 2018/0289585 | A1* | 10/2018 | Murison ................ | H02K 7/003 |
| 2019/0110949 | A1* | 4/2019 | Bhatti .................... | A61H 23/02 |
| 2020/0268595 | A1* | 8/2020 | Lewis ................ | A61H 23/0263 |

* cited by examiner

STIMULATING DEVICE

TECHNICAL FIELD

The present disclosure relates to the technical field of massage devices, in particular to a stimulating device with multiple vibration effects.

BACKGROUND ART

Currently, commercially available adult products for females, such as a stimulating device, are used for stimulating a female's vagina or clitoris, so that the female can obtain a pleasant sensation, thereby achieving the purpose of relaxation.

However, most of the existing stimulating devices may not provide high quality massage effects because different users have different requirements.

DETAIL DESCRIPTION

The following provides a clear and detailed description of the technical solution in the embodiments of the present invention model. Obviously, the described embodiments are a part of the embodiments of the present invention model, rather than the entire embodiments. Unless otherwise defined, all technical and scientific terms used in this article have the same meanings as those commonly understood by those skilled in the art belonging to this invention model. The terms used in the specification of this invention model are only for the purpose of describing specific embodiments and are not intended to limit the invention model.

The following text will provide a detailed description of the embodiments of the present invention model. However, the present invention model may take many different forms and should not be construed as limited to the exemplary embodiments described herein.

Figure 1:
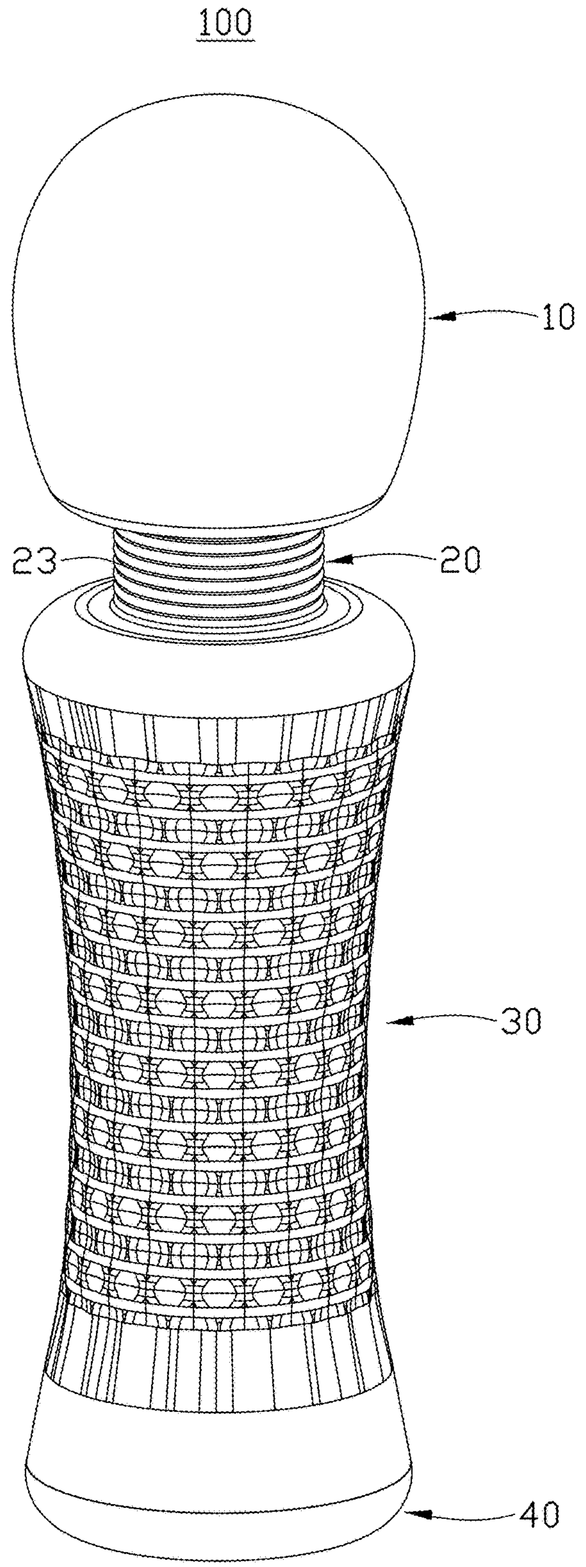
FIG. 1 is a perspective view of a stimulating device according to an embodiment of the present disclosure.

Referring to FIG. 1, a stimulating device 100 provided by an embodiment of the present invention includes a stimulating member 10, a cushioning member 20, a main body 30 and a chassis 40. The stimulating portion 10 is located at the top of the stimulating device 100 for massaging the user. The stimulating portion 10 may be a sphere or a square shape, or the like. In the present embodiment, the stimulating portion 10 is roughly spherical, and an exterior thereof is covered with a protective cover which is made of soft rubber material so as to fit the skin of a user and provide the user with a soft and comfortable touch sense. The main body 30 includes a waist part with a slightly narrow diameter, which forms a handle portion. In addition, the stimulating member 10 is supported by the main body 30 and swingable related to the main body 30. The stimulating member 10 and the main body 30 are two independent components, vibration forces generated when the stimulating member 10 vibrates is absorbed by the cushioning member 20, so that the vibration forces will not be transmitted to the main body 30 in some extents.

The cushioning member 20 is connected to the stimulating member 10 and the main body 30. The cushioning member 20 is configured for reducing the vibrations to transmit to the handle portion. In the present embodiment, cushioning member 20 includes a damping spring 21 extending in a spiral shape around a longitudinal axis of the main body 30. In addition, for the purpose of waterproofing, an outer side of the damping spring 21 is covered with a layer of silica gel skin 23 with a spiral appearance that fits the shape thereof, and the silica gel skin 23 is embedded in silica gel parts on outer layers of the stimulating portion 10 and the main body 30 through an upper and lower reverse buckling design, and is compressed and sealed so as to achieve a waterproofing effect. In addition, silica gel skin 23 can be independently wrapped around the outer circumference of the damping spring 21, and its two ends are fixed by adhesive. Moreover, silica gel skin 23 can also be made of the same material as the protective cover of stimulating member 10 and integrated into one piece.

The main body 30 is a rod-shaped body, which may be shaped as a cylinder, a rectangular body, etc. In the present embodiment, the main body 30 is wider at both ends and slightly narrower in the middle, thereby facilitating grasp by the user. In addition, a surface of the main body 30 is also covered with a protective cover, lots of decorative patterns are formed on the protective cover in methods of printing or engraving or the like, so as to improve the overall sense of design and attractiveness of the stimulating device 100. In one embodiment, the outer surface of the main body 30 may also be sleeved with a soft rubber cover, made from a soft material, with patterns, and the soft rubber cover can give a soft hand feeling to a holder and endow the main body 30 with a decorative property. The stimulating member 10 and the main body 30 are made from a first material, the protective cover is made from a second material, and elasticity of the first material is less than that of the second material.

The chassis 40 may be connected to a lower end of the main body 30 in manners of screwing, snap-fitting, or gluing or the like. In the present embodiment, the chassis 40 is an electroplated cover disposed at the lower end of the main body 30 in a sleeving mode.

Figure 2:
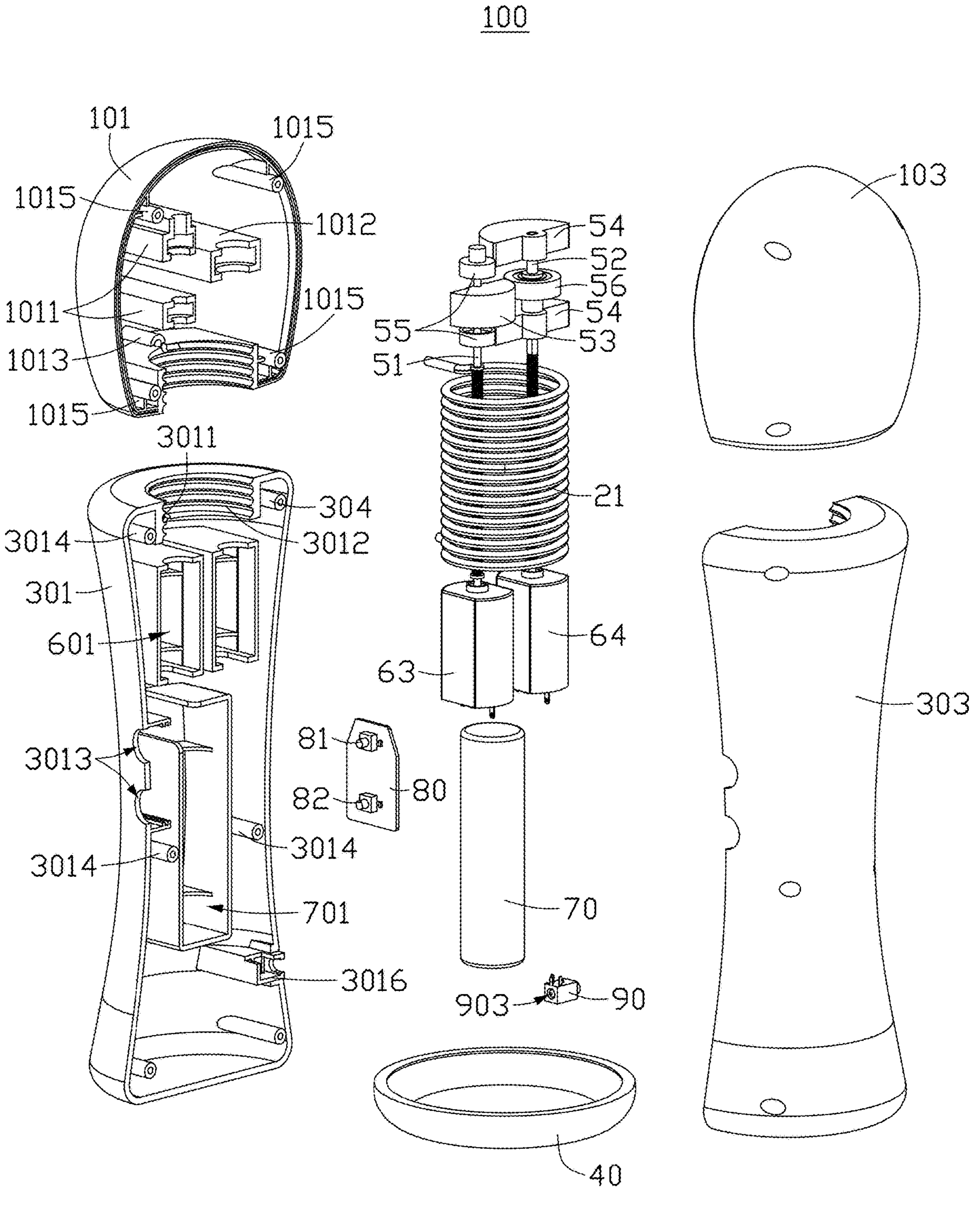
FIG. 2 is an exploded schematic view of the stimulating device shown in FIG. 1 viewed from a viewing angle.
Figure 3:
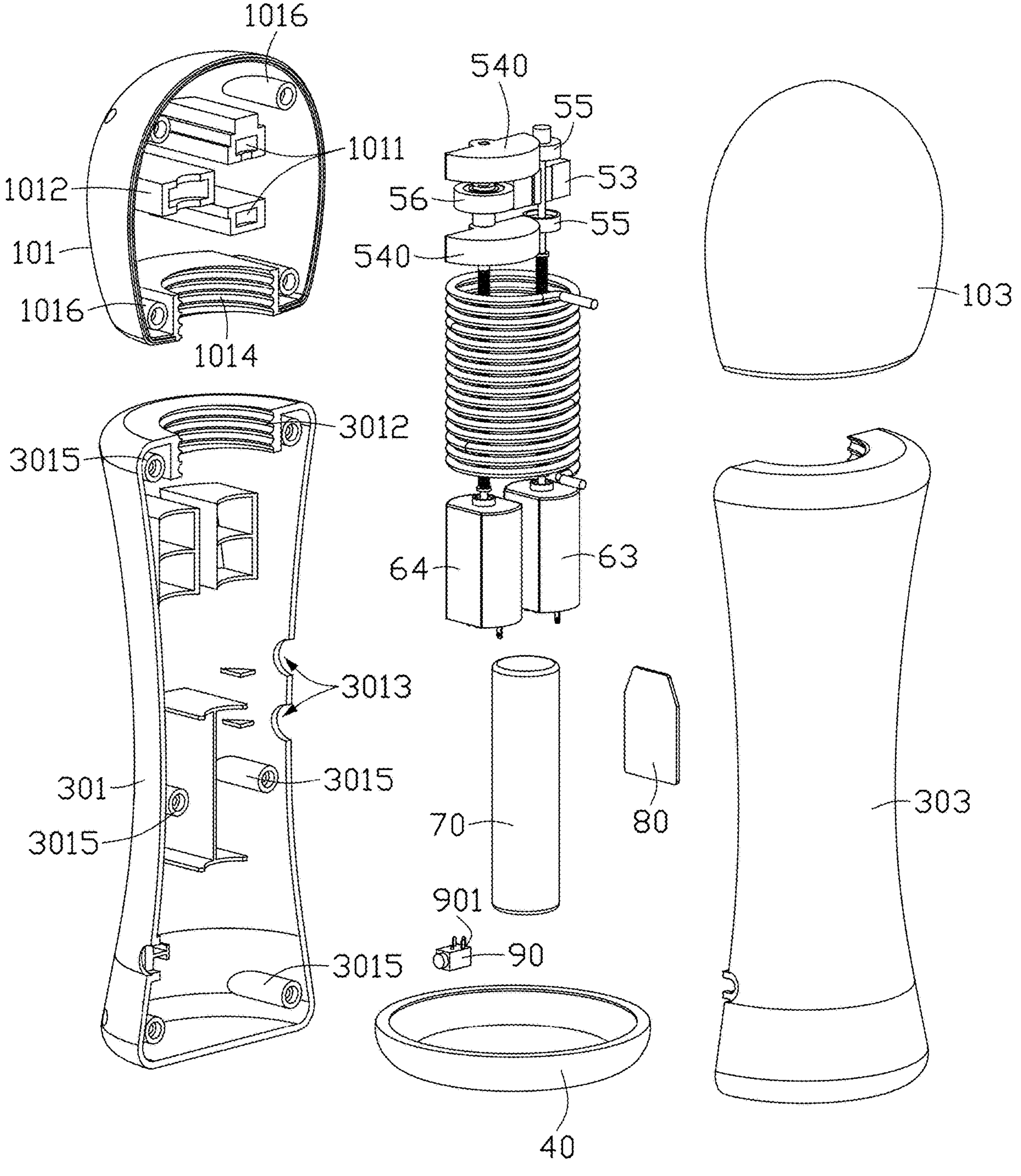
FIG. 3 is an exploded schematic view of the stimulating device shown in FIG. 2 viewed from another viewing angle.

Referring to FIG. 2 and FIG. 3, the stimulating member 10 of the stimulating device 100 includes two detachable shells. The main body 30 includes two detachable housings. Specifically, the stimulating member 10 includes a first shell 101 and a second shell 103 cooperating with the first shell to define a receiving space in the stimulating member 10. The housings of the main body 30 include a first housing 301 and a second housing 303 cooperating with the first housing 301 for defining an accommodating space in the main body 30. A first receiving chamber 601 and a second receiving chamber 701 with different shapes and sizes are formed in the first housing 301. A pair of first mounting brackets 1011 and a second mounting bracket 1012 are disposed on an inner wall of the first shell 101. A hollow fixed post 1013 is formed next to a lower end of the first shell 101. A hollow fixed post 3011 is formed next to an upper end of the first housing 301. Both ends of the damping spring 21 are embedded in the fixed post 1013 and the fixed post 3011 after engaging with the first shell 101 and the first housing 301, respectively. In addition, a plurality of first thread grooves 1014 are formed at lower ends of the first shell 101 and the second shell 103. A plurality of second thread grooves 3012 are formed at upper ends of the first housing 301 and the second housing 303. The opposite ends of the damping spring 21 are engaged with the tread grooves 1014 and 3012. Two semi-circular notches 3013 are defined in corresponding side edges of the first housing 301 and the second housing 303 of the main body 30. A plurality of mounting posts 1015 are formed in the receiving space of the stimulating member 10, and a plurality of mounting posts 3014 are formed in the accommodating space of the main body 30 at positions where is close to the stimulating member 10. Correspondingly, a plurality of cylinders 1016 and 3015 are formed corresponding to the mounting posts 1015 and 3014. the plurality of mounting posts 1015 and 3014 are inserted into the plurality of cylinders 1016 and 3015. A mounting portion 3016 is close to a lower end of the first housing 301.

Figure 4:
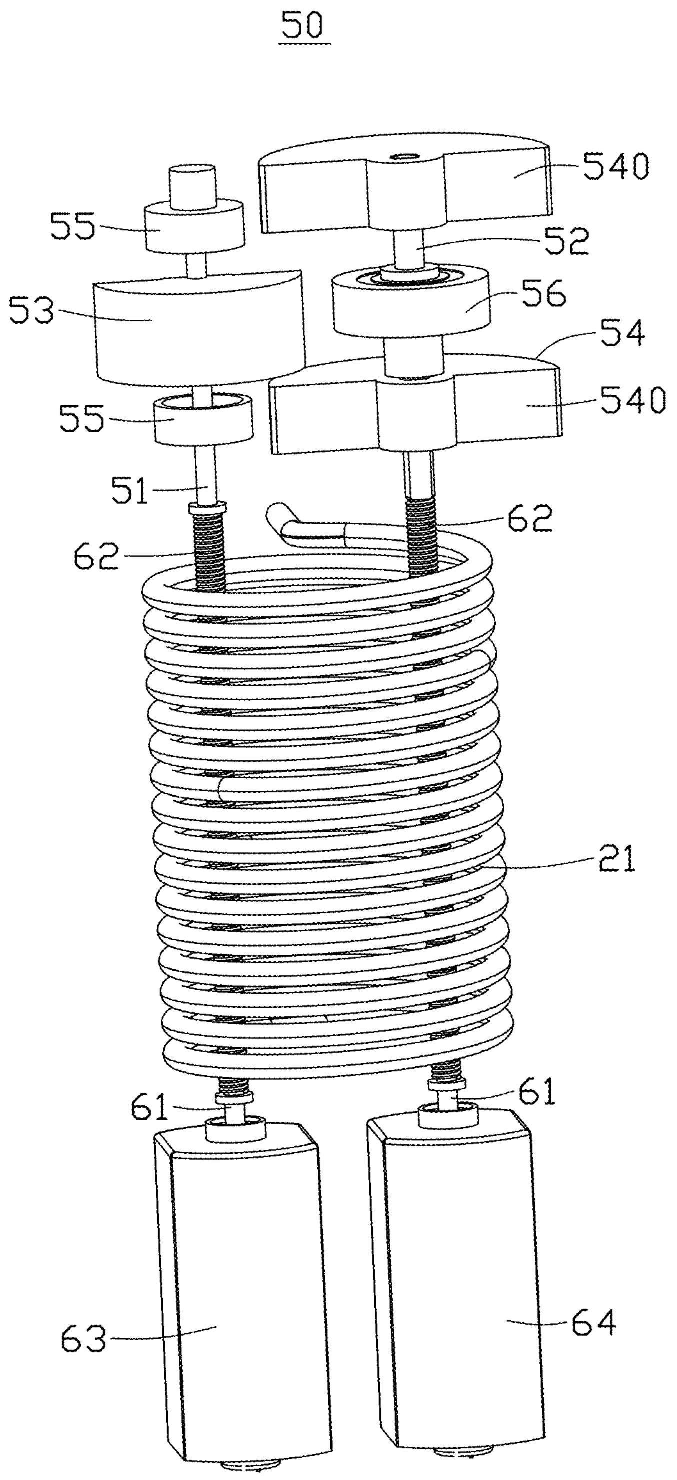
FIG. 4 is an enlarged schematic view of a portion of the stimulating device shown in FIG. 2.

Please refer to FIG. 4 together, the stimulating device 100 further comprises a vibration generating member, and a driving portion, a battery 70, and a circuit board 80. The vibration generating member is received in the receiving space of the stimulating member 10. The circuit board 80 is received in the accommodating space of the main body 30. The driving portion is connected to the vibration generating portion. The battery 70 is electrically coupled to the circuit board 80.

The vibration generating member includes a first oscillating portion and a second oscillating portion. The first oscillating portion includes a first fixing shaft 51, a first oscillating block 53 fixed on the first fixing shaft 51 in a penetrating mode, and a pair of first bearings 55 with a first size fixed on the first fixing shaft 51 and located on upper and lower sides of the first oscillating block 53. The second oscillating portion includes a second fixing shaft 52, a plurality of second oscillating blocks 54 fixed on the second fixing shaft 52 in a penetrating mode, and a second bearing 56 with a second size which is larger than the first size fixed to the second fixing shaft 52 and located between the second oscillating blocks 54. In the present embodiment, the number of the first oscillating block 53 is one, thereby forming a single-pendulum structure. The weight range of the single-pendulum structure is 1-90 g, and in this embodiment, 15 g is preferred. The number of the second oscillating blocks 54 is two, thereby forming a double-pendulum structure. The weight range of this double-pendulum is 2-95 g. In this embodiment, 30 g is preferred. In addition, the first oscillating block 53 and the second oscillating block 54 are both of an eccentric structure and may be crescent-shaped.

The driving portion includes two driving shafts 61 disposed in parallel, transmission elastic members 62 supported by the driving shafts 61, a first driving motor 63, and a second driving motor 64. The first driving motor 63 is attached to the lower end of the driving shaft 61 which is away from the first oscillating block 53. The second driving motor 64 is attached to a lower end of the driving shaft 61 which is away from the second oscillating block 54. The first driving motor 63 and the second driving motor 64 are each electrically connected to the battery 70 and acquire power from the battery 70. The damping spring 21 is disposed surrounding the two driving shafts 61.

The battery 70 may be a disposable battery (zinc-manganese dry battery) or a rechargeable lithium battery or the like. The battery 70 is a rechargeable battery built into the main body 30. The circuit board 80 is a commonly used printed circuit board on which various circuits are laid and is electrically connected to the first driving motor 63 and the second driving motor 64 to control actions of the first driving motor 63 and the second driving motor 64. The circuit board 80 is provided with a first control switch 81 and a second control switch 82. Therefore, the stimulating device 100 is switchable between different vibration modes by pressing the first control switch 81 and/or the second control switch 82.

In the present embodiment, the stimulating device 100 is further provided with a DC charging interface 90, and the DC charging interface 90 is mounted at a position, close to a lower end, of an inner wall of the first mounting housing 301 and used for charging the battery 70. Specifically, the DC charging interface 90 is received in the mounting portion 3016, a plurality of contact chips 901 for being electrically conductive with the battery 70 are formed above the DC charging interface 90, and a charging cable connection port 903 is formed in one end face thereof.

Figure 5:
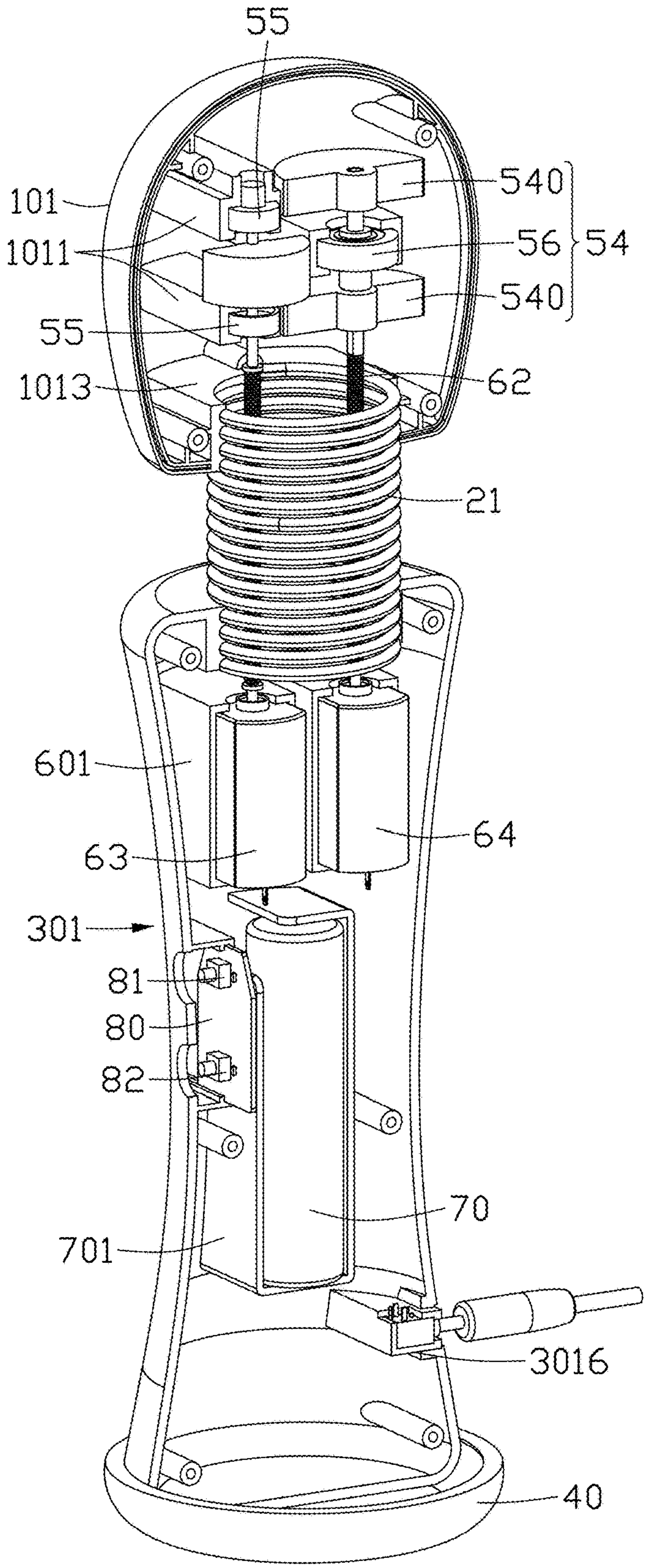
FIG. 5 is a perspective view illustrating an interior of the stimulating device.

Please refer to FIG. 5, the first oscillating block 53 and the second oscillating blocks 54 of the vibration generating portion are received in the receiving space in a non-interference manner. The first driving motor 63 and the second driving motor 64 of the driving portion are mounted in the first receiving chamber 601, and the battery 70 is mounted in the second receiving chamber 701. The first bearings 55 and the second bearing 56 are fixed in the pair of first mounting brackets 1011 and the second mounting bracket 1012, respectively. The first control switch 81 and the second control switch 82 on the circuit board 80 are exposed from the notches 3013 to facilitate a pressing operation by the user.

When the first shell 101 and the second shell 103 are assembled, the first oscillating block 53 is received in a space between the pair of first mounting brackets 1011, and the second oscillating block 54 is received in a space between upper and lower sides of the second mounting bracket 1012. When the first housing 301 and the second housing 303 are assembled, the notches 3013 in the first housing 301 and the second housing 303 are merged into a complete hole (not labeled) for exposing the first control switch 81 and the second control switch 82. Then, the two transmission elastic members 62 are disposed corresponding to the cushioning portion 20, and the damping spring 21 is disposed surrounding the two transmission elastic members 62. One end of each transmission elastic member 62 extends into the stimulating member 10 and another end extends into the main body 30. The damping spring 21 has a restoring force stronger than that of the transmission elastic member 62. The transmission elastic member 62 is easier to swing than that of the damping spring 21. Further, the damping spring 21 prevents the transmission elastic members 62 from overbending. Thus, it has a good bending vibration sensation of the stimulating member 10, which at the same time plays a role in protecting the transmission elastic members 62 against excessive distortion. In addition, the stimulating member 10 and the driving motor are in transmission by the transmission elastic member 62, so that a vibration force generated during a vibration movement of the stimulating member 10 is reduced to be transmitted to the main body 30.

Please refer to FIG. 5, the diameter of the second fixing shaft 52 is slightly greater than that of the first fixing shaft 51. The structure and size of the two driving shafts 61 are approximately the same. The two transmission elastic members 62 are connected between the driving portion and the oscillating portion. One end of one of the transmission elastic members 62 is fixed to the driving shaft 61 of the first driving motor 63, and another end is fixed to the first fixing shaft 51 of the first oscillating portion. One end of the other transmission elastic member 62 is fixed to the driving shaft 61 of the second driving motor 64, and another end is fixed to the second fixing shaft 52 of the second oscillating portion. The two driving shafts 61, as output shafts of the first driving motor 63 and the second driving motor 64, are connected to lower ends of the first fixing shaft 51 and the second fixing shaft 52 through the transmission elastic members 62, respectively. The first oscillating block 53 and the second oscillating block 54 are both of an eccentric block structure, and both are substantially crescent-shaped. The second oscillating block 54 includes two substantially crescent-shaped oscillating members 540. The two oscillating members 540 are fixed on the second fixing shaft 52 and spaced with each other. The second bearing 56 is mounted between the two oscillating members 540 adjacent to the first oscillating block 53.

In the following, a working principle of the stimulating device 100 involved in the present disclosure is specifically described. When the user presses the first control switch 81 for a long time (e.g., 10 seconds), the stimulating device 100 is turned on. When the user presses the first control switch 81 for a short period of time (e.g., 5 seconds), the first driving motor 63 is powered on and works, thereby driving one driving shaft 61 connected thereto to rotate at a first speed. The driving shaft 61 drives the transmission elastic member 62 fixed thereof to rotate in the process of rotation and then drives the first fixing shaft 51 and the first oscillating block 53 thereon to sway at 360 degrees by the transmission of the transmission elastic member 62. On the other hand, when the user presses the second control switch 82 for a short period of time (e.g., 5 seconds), the second driving motor 64 is powered on and works, thereby driving the other driving shaft 61 connected thereto to rotate at a second speed, and the driving shaft 61 drives the transmission elastic member 62 fixed thereof to rotate in the process of rotation, and then drives the second fixing shaft 52 and the second oscillating blocks 54 to sway at 360 degrees by the transmission of the transmission elastic member 62.

In the above-mentioned operation process, the first driving motor 63 and the second driving motor 64 periodically drive the two driving shafts 61 to rotate. The first bearing 55 and the second bearing 56 are fixed in the first mounting brackets 1011 and 1012 and thus are not swayable. The first oscillating block 53 together with the first fixing shaft 51 and the second oscillating block 54 together with the second fixing shaft 52 rotate with respect to the first bearing 55 and the second bearing 56, respectively. The transmission elastic members 62 connected to the lower ends of the first fixing shaft 51 and the second fixing shaft 52 are compressed in the process of rotation, thereby accumulating a twisting force. An elastic force is thus released when the rotation of the driving shafts 61 stop, such that the first oscillating block 53 and the second oscillating block 54 are violently shaken in corresponding receiving spaces thereof (i.e., the first driving motor 63 and the second driving motor 64 transmit a twisting force to the eccentric first oscillating block 53 and second oscillating block 54 via the respective driving shafts 61 and the transmission elastic members 62). During the shaking process after power on, the first oscillating block 53 and the second oscillating block 54 can make the whole stimulating portion 10 produce vibration effects of different degrees. The damping spring 21 of the cushioning portion 20 serves to unload the force, i.e., it can disperse a vibration force generated by the stimulating portion 10, so that vibration of the stimulating portion 10 cannot drive the main body 30 to resonate together.

In addition, the first oscillating block 53 and the second oscillating block 54 is selectable to allow only one the first oscillating block 53 and the second oscillating block 54 oscillating at a certain time or oscillating together at the same time without interfering with each other. That is, the driving portion drives the first oscillating portion and the second oscillating portion to vibrate alternately or simultaneously, so that the stimulating portion has different vibration modes relative to the main body. Hereinafter, reference is made to FIG. 6A to FIG. 6C to specify working states of the stimulating device 100 in different vibration modes.

Figure 6A:
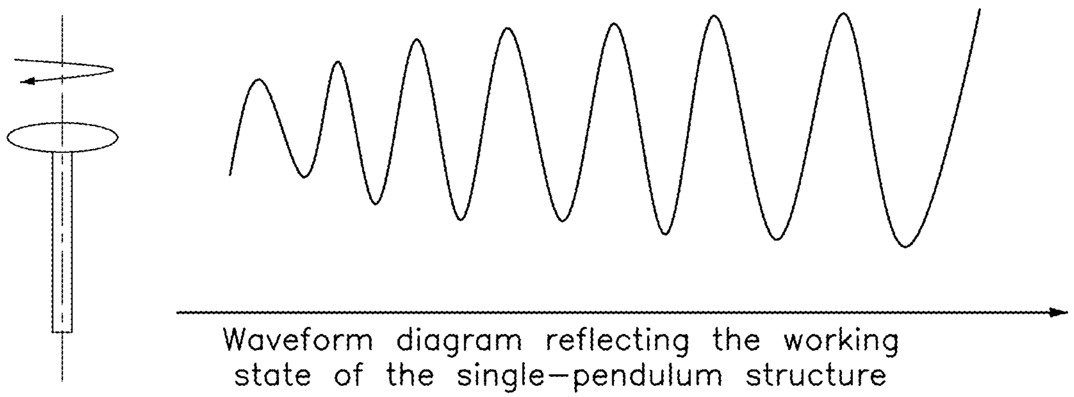
FIG. 6A is a schematic view illustrating a first working state of the stimulating device in a first vibration mode.
Figure 6B:
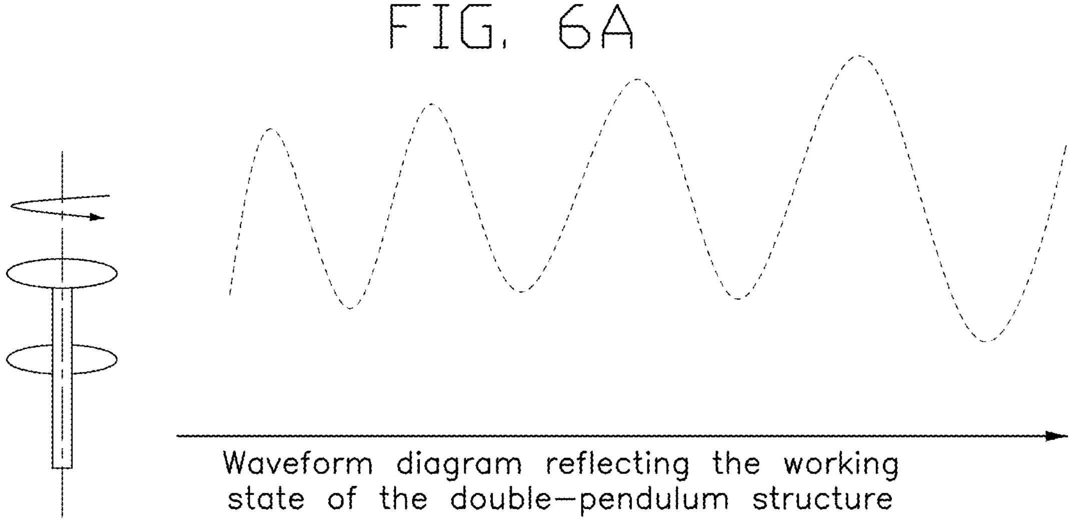
FIG. 6B is a schematic view illustrating a second working state of the stimulating device in a second vibration mode.
Figure 6C:
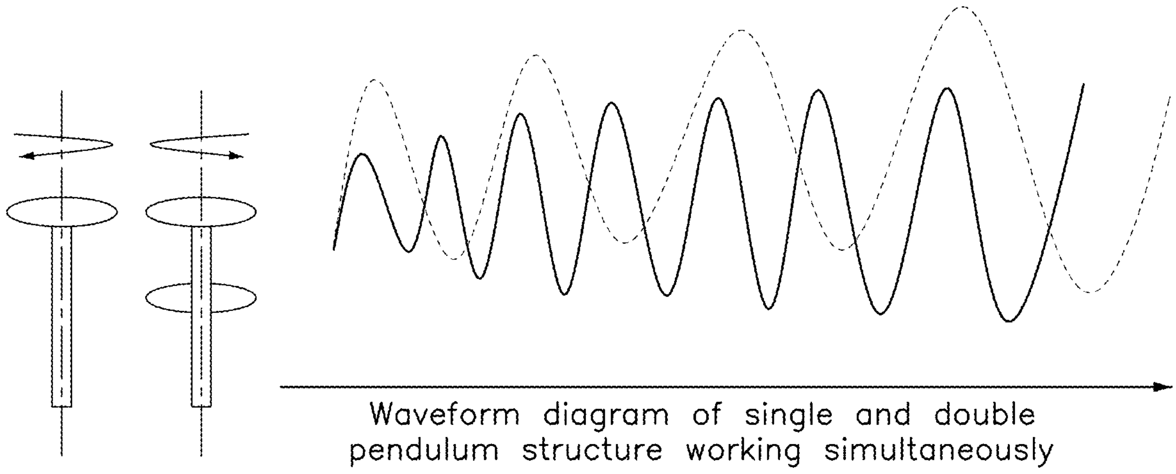
FIG. 6C is a schematic view illustrating a third working state of the stimulating device in a third vibration mode.

As shown in FIG. 6A to FIG. 6C, the driving portion drives the first oscillating portion and the second oscillating portion to oscillate, thereby making the whole stimulating portion 10 have different vibration amplitudes relative to the main body 30 while making the stimulating portion 10 oscillate. Specifically, as shown in FIG. 6A, when the driving portion only drives the first oscillating block 53 (single-pendulum) to perform swinging motion, due to the light weight of the first oscillating block 53, it can achieve high-frequency and fast swinging of the first oscillating block 53 (with a speed of 4000-10500 RPM). At this moment, it can be seen from waveform reflecting the working state of the single-pendulum structure that, the peaks of the curve are relatively dense; the stimulating portion 10 vibrates at a first amplitude relative to the handle portion 30. The first vibration amplitude is relatively small. As shown in FIG. 6B, when the driving portion only drives the second oscillating block 54 (double-pendulum) to perform swinging motion, due to the heavy weight of the second oscillating block 54, it can achieve low-frequency and slow swinging of the second oscillating block 54 (with a speed of 3500-10000 RPM). At this moment, it can be seen from waveform reflecting the working state of the double-pendulum structure that, the peaks of the curve are relatively sparse; the stimulating portion 10 vibrates at a second amplitude relative to the handle portion 30. The second vibration amplitude is greater than the first vibration amplitude. As shown in FIG. 6C, when the driving portion simultaneously drives the first oscillating block 53 and the second oscillating block 54 to swing, it can simultaneously achieve high-frequency and fast swing of the first oscillating block 53 (with rotation speed of 4000-10500 RPM) and low-frequency and slow swing of the second oscillating block 54 (with rotation speed of 3500-10000 RPM), so that the stimulating portion 10 vibrates relative to the handle portion 30 at a third vibration amplitude. Among them, the third vibration amplitude is the maximum vibration amplitude that this stimulation device can achieve.

More specifically, the driving portion includes a first driving motor 63 and a second driving motor 64. The first oscillating portion is connected to the first driving motor 63. Under the drive of the first driving motor 63, the first oscillating portion oscillates at a high frequency and fast speed (with a rotation speed of 4000-10500 RPM) within the stimulating portion 10, so that the stimulating portion 10 has a first vibration amplitude. The second oscillating portion is connected to the second driving motor 64. Under the drive of the second driving motor 64, the second oscillating portion oscillates at a low frequency and slow speed (with a rotation speed of 3500-10000 RPM) within the stimulating portion 10, so that the stimulating portion 10 has a second vibration amplitude. Under the coordinated driving of the first driving motor 63 and the second driving motor 64, both the first oscillating portion and the second oscillating portion can oscillate simultaneously within the stimulating portion 10 to achieve the third vibration amplitude of the stimulating portion 10. Among them, the first vibration amplitude is smaller than the second vibration amplitude, and the third vibration amplitude is larger than the second vibration amplitude.

Furthermore, the circuit board 80 of the stimulation device 100 is installed inside the handle portion 30, and a switch portion is provided on the circuit board, which is connected to the driving portion. By controlling the driving of the driving portion through the switch portion, the first vibration amplitude, the second vibration amplitude, and the third vibration amplitude of the stimulating portion 10 are achieved. The switch portion includes the first control switch 81 and the second control switch 82 mentioned above. The first control switch 81 can control the first oscillating portion to achieve the first vibration amplitude of the stimulating portion 10. The second control switch 82 can control the second oscillating portion to achieve the second vibration amplitude of the stimulating portion 10. In this embodiment, the movement of the first oscillating portion and the second oscillating portion can be simultaneously controlled by pressing the first control switch 81 and the second control switch 82 to achieve the third vibration amplitude of the stimulating portion 10. In summary, the first oscillating block 53 and the second oscillating block 54 are mounted in the stimulating portion 10 of the stimulating device 100, which can enhance the overall massage intensity of the stimulating portion 10, and three vibration modes, namely, only the first oscillating block 53 works, only the second oscillating block 54 works, and the first oscillating block 53 and the second oscillating block 54 work at the same time can be switched. Specifically, the driving portion only drives the first oscillating block 53 to vibrate, thereby realizing a first vibration mode with a smaller amplitude. The driving portion only drives the second oscillating block 54 to vibrate, thereby realizing a second vibration mode with a moderate amplitude. The driving portion simultaneously drives the first oscillating block 53 and the second oscillating block 54 to vibrate, thereby realizing a third vibration mode with a larger amplitude. When the stimulating device 100 is started, the first oscillating block 53 and the second oscillating block 54 of the stimulating portion 10 have amplitudes at two different tap positions and can operate interactively. Thereby, the user is able to experience stimulation caused by the first oscillating block 53 alone, stimulation caused by the second oscillating block 54 alone, and stimulation caused by strong vibration when the first oscillating block 53 and the second oscillating block 54 operate at the same time.

It may be understood that in other embodiments of the present invention, the first and second oscillating blocks 53 and 54 may also have different swing magnitudes by adjusting weights of the first and second oscillating blocks 53 and 54, changing models of the first and second driving motors 63 and 64 to change a rotation speed of the driving shaft 61 (motor output shaft) and the like, thereby changing the massage feeling brought by the stimulus part 10 as a whole.

It may be understood that, as a variant example, it is also possible to dispose a plurality of oscillating portions in the stimulating portion 10 on the premise of changing the size of the stimulating device 100, for example, a plurality of fixing shafts on which the first oscillating block or the second oscillating block is fixed are disposed in the stimulating portion 10, and accordingly it is sufficient to increase the number of the driving motors, within the main body 30, connected to the fixing shaft.

In addition, the periphery of the stimulating portion 10 is made of a soft rubber material, which makes it more convenient to closely fit the skin for massage, thereby bringing a comfortable feeling to the user. In addition, since both the transmission elastic member 62 and the damping spring 21 located on a neck portion of the stimulating device 100 can play a role in damping vibration, the user holding the main body 30 can hardly feel the vibration of the main body 30 although she can touch the strong vibration of the stimulating portion 10, and she will not have the feeling of her hand being numbed by the vibration even if she holds a machine body (the main body) for a long time. Further, the vibration-damping compression spring 21 of the cushioning portion 20 of the stimulating device 100 can rotate at 360 degrees to bring massage stimulation in different directions to the user. Further, the stimulating portion, the cushioning portion, and the main body of the present stimulating device are all made of waterproof and grease-resistant materials, which have the effect of being wholly waterproof and sanitary.

Those of ordinary skill in the art should recognize that the above embodiments are only used to illustrate the present invention, and are not intended to be used as a limitation on the present invention, and as long as they are within the scope of the substantive spirit of the present invention, appropriate changes and variations to the above embodiments fall within the scope of the disclosure of the present invention.

Ordinary technical personnel in this field should recognize that the above embodiments are only used to illustrate the present application, and not to limit the present application. Any appropriate changes and variations made to the above embodiments within the substantive spirit of this application are within the scope disclosed in this application.

What is claimed is:

1. A stimulating device comprising:

a handle portion;

a driving portion received in the handle portion;

a stimulating portion supported by the driving portion, a first oscillating block mounted within the stimulating portion; and a second oscillating block mounted within the stimulating portion and adjacent to the first oscillating block, each of the first oscillating block and the second oscillating block including at least one oscillating mass, the number of the oscillating mass of the first oscillating block is smaller than that of the second oscillating block, wherein the driving portion comprises a first driving motor and a second driving motor separately controlled by a circuit board, the first driving motor is mounted in the handle portion and is connected to the first oscillating block;

the second driving motor is installed in the handle portion and is connected to the second oscillating block; and a weight of the first oscillating block is lesser than a weight of the second oscillating block, the stimulating portion vibrates at a first vibration amplitude when the first oscillating block is driven by the first driving motor, the stimulating portion vibrates at a second vibration amplitude when the second oscillating block is driven by the second driving motor, and the stimulating portion vibrates a third vibration amplitude when the first and the second oscillating blocks are respectively driven by the first and the second driving motors, wherein the first vibration amplitude is less than the second vibration amplitude, and the third vibration amplitude is greater than the second vibration amplitude;

wherein the first oscillating block has one oscillating mass, and the second oscillating block has two oscillating masses, the two oscillating masses are spaced with each other, the oscillating mass of the first oscillating block is located between the two oscillating masses of the second oscillating block, the oscillating mass of the first oscillating block and the two oscillating masses of the second oscillating block are arranged along a line.

2. The stimulation device according to claim 1, wherein the first oscillating block is driven by the first driving motor to oscillate in the stimulating portion between a minimum speed of 4000 RPM and a maximum speed of 10500 RPM, when the stimulating portion vibrates at the first vibration amplitude.

3. The stimulation device according to claim 1, wherein the second oscillating block is driven by the second driving motor to oscillate between a minimum speed of 3500 RPM and a maximum speed of 10000 RPM in the stimulating portion, when the stimulating portion vibrates at the second vibration amplitude.

4. The stimulation device according to claim 1, wherein the first oscillating block and the second oscillating block oscillate simultaneously, when the stimulating portion vibrates at the third vibration amplitude;

a swing frequency and a speed of the first oscillating block are greater than a swing frequency and a speed of the second oscillating block.

5. The stimulation device according to claim 1, wherein the first oscillating block is connected to the first driving motor and is driven by the first driving motor to oscillate at a speed of 4000-10500 RPM when the stimulating portion vibrates at the first vibration amplitude;

the second oscillating block is connected to the second driving motor and is driven by the second driving motor to oscillate at a speed of 3500-10000 RPM, when the stimulating portion vibrates at the second vibration amplitude;

the first oscillating block and the second oscillating block are respectively driven by the first motor and the second motor, and oscillate simultaneously, when the stimulating portion vibrates at the third vibration amplitude.

6. The stimulation device according to claim 5, wherein the stimulation device further comprises a circuit board installed in the handle portion;

the circuit board comprises a switch portion electrically connected to the driving portion;

the driving portion drives the stimulating portion to vibrate at a first vibration amplitude, the second vibration amplitude, and the third vibration amplitude in response to a selection via the switch portion.

7. The stimulation device according to claim 6, wherein the switch portion comprises a first control switch and a second control switch;

the first control switch controls the first oscillating block to drive the stimulating portion to vibrate at the first vibration amplitude; and the second control switch controls the second oscillating portion to drive the stimulating portion to vibrate at the second vibration amplitude.

* * * * *